United States Patent [19]
Bringley et al.

[11] Patent Number: 5,549,844
[45] Date of Patent: Aug. 27, 1996

[54] RADIOGRAPHIC PHOSPHOR PANEL, PHOSPHOR AND PHOSPHOR MODIFICATION METHOD

[75] Inventors: Joseph F. Bringley, Rochester; Kyle E. Smith, Victor; Patrick M. Lambert, Rochester, all of N.Y.

[73] Assignee: Eastman Kodak Company, Rochester, N.Y.

[21] Appl. No.: 410,471

[22] Filed: Mar. 24, 1995

[51] Int. Cl.$^6$ .................................................. C09K 11/61
[52] U.S. Cl. ........................... 252/301.4 H; 252/301.4 S; 428/402; 428/403; 250/484.4
[58] Field of Search .................................. 428/402, 403; 252/301.4 R, 301.4 H, 301.4 S; 250/484.4

[56] References Cited

U.S. PATENT DOCUMENTS

| | | | |
|---|---|---|---|
| 2,502,529 | 4/1950 | Murray | 250/327.2 |
| 2,887,379 | 5/1959 | Blake et al. | 250/327.2 |
| 3,300,310 | 1/1967 | Kennard et al. | 250/483 |
| 3,300,311 | 1/1967 | Kennard et al. | 250/483 |
| 3,617,285 | 11/1971 | Staudenmayer | 250/80 |
| 3,617,332 | 11/1971 | Lehmann | 117/33.5 C |
| 3,743,833 | 7/1973 | Martic et al. | 250/483 |
| 4,071,640 | 1/1978 | Ignasiak | 252/301.4 R |
| 4,374,905 | 2/1983 | Rabatin | 428/691 |
| 4,380,702 | 4/1983 | Takahashi et al. | 250/327.2 |
| 4,491,736 | 1/1985 | Teraoka | 250/484.1 |
| 4,505,989 | 3/1985 | Umemoto et al. | 252/301.4 H |
| 4,912,333 | 3/1990 | Roberts et al. | 250/487.1 |
| 5,382,452 | 1/1995 | Bruno | 427/215 |
| 5,401,971 | 3/1995 | Roberts | 250/487.1 |

FOREIGN PATENT DOCUMENTS

| | | |
|---|---|---|
| 0142734 | 5/1985 | European Pat. Off. . |
| 0234385 | 9/1991 | European Pat. Off. . |
| 2017140 | 10/1979 | United Kingdom . |

OTHER PUBLICATIONS

*Research Disclosure*, vol. 154, Feb. 1977, Item 15444.
*Research Disclosure*, vol. 176, Dec. 1978, item 17643, Section XVII.
*Research Disclosure*, vol. 184, Aug. 1979, Item 18431, Section I.

*Primary Examiner*—Melissa Bonner
*Attorney, Agent, or Firm*—Robert Luke Walker

[57] ABSTRACT

A radiographic phosphor panel, phosphor, and phosphor modification method. The radiographic phosphor panel has a luminescent layer including a mass of phosphor particles. The phosphor particles each have a primary portion and a secondary portion. The secondary portion is exterior to and continuous with the primary portion. The primary portion includes a primary phosphor having a combination of species characterized by the relationship:

$$MFX_{1-z}I_z \cdot uM^aX^a : yA : eJ : tD : dS$$

The secondary portion includes a secondary phosphor having a combination of species characterized by the relationship:

$$M'FX'_{1-z+q}I_{z-q} \cdot u'M^{a'}X^{a'} : y'A' : e'J' : t'D' : d'S$$

In these relationships, M and M' are selected from Mg, Ca, Sr, and Ba; X and X' are selected from Cl and Br; $M^a$ and $M^{a'}$ are selected from Na, K, Rb, and Cs; $X^a$ and $X^{a'}$ are selected from F, Cl, and Br; A and A' are selected from Eu, Ce, Sm, and Tb; J and J' are metal oxide; D and D' are selected from V, Cr, Mn, Fe, Co, and Ni; z is greater than $1\times10^{-2}$ and less than 1; q is from $1\times10^{-2}$ to 1 and less than or equal to z; u and u' are from 0 to 1; y and y' are from $1\times10^{-4}$ to 0.1; e and e' are from 0 to 1; and t and t' are from 0 to $1\times10^{-2}$.

28 Claims, No Drawings

RADIOGRAPHIC PHOSPHOR PANEL, PHOSPHOR AND PHOSPHOR MODIFICATION METHOD

FIELD OF THE INVENTION

The invention relates to radiography and radiographic materials. The invention more particularly relates to a phosphor, a radiographic phosphor panel, and a method for modifying radiographic phosphor.

BACKGROUND OF THE INVENTION

A radiographic phosphor panel contains a layer of phosphor, a crystalline material which responds to X-radiation on an image-wise basis. Like many other crystalline materials, radiographic phosphors have a crystal matrix which allows for the replacement of some atoms by other similar atoms, but does not readily accept other atoms or moieties. Radiographic phosphor panels can be classified, based upon their phosphors, as prompt emission panels and image storage panels.

Intensifying screens are the most common prompt emission panels. Intensifying panels are used to generate visible light upon exposure of the intensifying panel to X-radiation. A sheet of photographic film is positioned to intercept the visible light generated and commonly is pressed against the intensifying panel within a light-tight cassette. Other prompt emission panels operate similarly, but in place of the photographic film have some other means for visualizing the X-radiation.

Storage panels have storage phosphors, that have the capability of storing latent X-ray images for later release, apparently by locally trapping electron-hole pairs created by incident X-rays. Storage phosphors are distinguishable from the phosphors used in X-ray intensifying or conversion screens. In the latter, a latent image is not stored and X-radiation causes the immediate release of visible light from irradiated phosphor crystals.

Radiation image storage panels are used in computed radiography. The panel is first exposed to X-radiation to create a latent image. The panel is then stimulated with longer wavelength radiation, resulting in the emission of radiation at a third wavelength. Typically a laser having a red or infrared beam is scanned over the panel, resulting in the emission of green or blue radiation. The emitted light is collected and the resulting signal is processed electronically to produce a final image.

Alkaline earth metal fluoro-iodide storage phosphors are described in a number of patent publications. European Patent Publication No. 0 142 734 A1 teaches a phosphor described by the formula:

$$BaF(Br_{1-x}J_x): yEu^{2+}$$

This application states that ". . . the phosphor containing three kinds of elements of fluorine, bromine and iodine as halogen which is a host component of the phosphor is prominently enhanced in the luminance of stimulated emission. The radiation image recording and reproducing method employing said stimulable phosphor can be remarkably enhanced in the sensitivity."

As a result of the incorporation of iodide into the storage phosphor, problems arose regarding the stability of the phosphor. This problem has been encountered in other halide containing phosphors as well and several strategies have been developed to solve this problem.

Radiation image storage panels, unlike intensifying screens, are subject to degradative losses of both emitted light and stimulating radiation. Since these effects are cumulative, discoloration can be an even more serious issue in storage panels than in intensifying screens.

Yellowing of a phosphor layer of a radiation image storage phosphor panel, in which the phosphor contains iodine, is described in European Patent Publication No. 0 234 385 B1. The yellowing is ascribed to liberation of free iodine. The solution taught for the yellowing problem, is incorporation in the phosphor layer of a compound containing a free epoxy group and/or a compound selected from: phosphites, organotin compounds, and metal salts of organic acids, specifically: octylic acid, lauric acid, stearic acid, oleic acid, ricinoleic acid naphthenic acid, 2-ethylhexanoic acid, resin acid, synthetic carboxylic acid, benzoic acid, salicylic acid, organic phosphinous acid, phenol, and alkylphenol.

The majority of the strategies developed have involved the inclusion of additives or "stabilizers" into the image storage panels. U.S. Pat. No. 4,374,905, to Rabatin, teaches the addition of anhydrous dessicating salts to intensifying screens. In GB 2 017 140 A, intensifying screens were stabilized against discolouration and hydrolysis by incorporation of a compound containing a free epoxy group and, optionally, a dialkyl tin compound. European Patent Specification No. 0 234 385 B1 discloses a solution to the yellowing problem found in image storage panels whose phosphors contain iodine. The solution involves incorporating into one of the layers of the panel a compound containing a free epoxy group and/or a compound selected from: phosphites, organotin compounds, and metal salts of particular organic acids. None of the above prior art describes chemical or compositional alterations on the phosphor itself.

U.S. Pat. No. 3,617,332, to Lehmann, discloses a method for stabilizing finely divided phosphors. An alkaline earth metal sulfide phosphor, such as CaS:Ce, is exposed to a solution of ammonium fluoride which reacts with the surface portion of the phosphor. The phosphor is then said to be "stabilized" with respect to water and air. This patent states:

"When the phosphor is mixed in the ammonium fluoride solution, the surface portions of the phosphor react with the fluorine to form a thin protecting film of calcium fluoride, although this film is not thick enough to inhibit the luminescent properties of the prepared phosphor".

No loss (or gain) in phosphor efficiency (speed) is observed as a result of the method. The "thin protecting film" of calcium fluoride is not itself luminescent.

It would be desirable to provide improved radiation image storage panels with high sensitivity and stability against yellowing and/or hydrolysis.

SUMMARY OF THE INVENTION

The invention, in its broader aspects, provides a phosphor, method for modifying phosphor, and a radiographic phosphor panel. The radiographic phosphor panel has a luminescent layer including a mass of phosphor particles. The phosphor particles each have a primary portion and a secondary portion. The secondary portion is exterior to and continuous with the primary portion. The primary portion includes a primary phosphor having a combination of species characterized by the relationship:

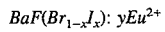

$$MFX_{1-z}J_z \cdot uM^aX^a{:}yA{:}eJ{:}tD{:}dS$$

The secondary portion includes a secondary phosphor having a combination of species characterized by the relationship:

$$M'FX'_{1-z+q}I'_{z-q} \cdot u'M^{a'}X^{a'} : y'A' : e'J' : t'D' : d'S$$

In these relationships, M and M' are selected from Mg, Ca, Sr, and Ba; X and X' are selected from Cl and Br; $M^a$ and $M^{a'}$ are selected from Na, K, Rb, and Cs; $X^a$ and $X^{a'}$ are selected from F, Cl, and Br; A and A' are selected from Eu, Ce, Sm, and Tb; J and J' are metal oxide; D and D' are selected from V, Cr, Mn, Fe, Co, and Ni; z is greater than $1\times10^{-2}$ and less than 1; q is from $1\times10^{-2}$ to 1 and less than or equal to z; u and u' are from 0 to 1; y and y' are from $1\times10^{-4}$ to 0.1; e and e' are from 0 to 1; and t and t' are from 0 to $1\times10^{-2}$.

It is an advantageous effect of at least some of the embodiments of the invention that the composite phosphor, method for preparing the phosphor, radiation image storage panels and prompt emission panels are provided which exhibit improved performance and enhanced stabilization against yellowing and or hydrolysis of the panel.

DESCRIPTION OF THE PREFERRED EMBODIMENTS

The composition of matter of the invention is a composite phosphor that has a primary portion having one phosphor composition and a secondary portion having another, different phosphor composition. Details of these compositions are discussed below. The composite phosphor is not limited to any particular configuration and is therefore generally referred to herein as a "mass". This term is inclusive, for example, of a discrete unitary article, such as a sintered agglomeration, a single fine particle and a body of fine particles. Since it is generally preferred that the composite phosphor be provided as a finely divided particulate, the discussion herein is generally directed to such a particulate. This should not be understood, however, to limit the scope of the invention.

The primary portion constitutes the majority of the mass and, in the case of a particulate; preferably, the majority of each particle. The term "majority" used herein in the sense of relative molar quantities or formula weights. The secondary portion can include the entire surface of the mass, that is, the secondary portion can encapsulate the primary portion; or alternatively, the secondary portion can include only a portion of the surface with the remainder of the surface primary portion. In the case of a particulate, the secondary portion can include the entire surface of each particle or only a portion of the surface of each particle or can include the entire surface of some particles and only a portion of the surface of others.

The secondary portion preferably includes the entire surface of the mass. In that case, the primary portion is limited to the interior of the mass. Thus, in a preferred particulate, the term primary portion refers to the collective interiors of individual particles and the term secondary portion refers to collective surfaces.

Both primary and secondary portions are alkaline earth metal fluorohalide phosphors. In the particular embodiment of the invention disclosed in detail herein, the primary portion is composed of a phosphor (also referred to herein as the "primary phosphor") that includes a combination of species characterized by the relationship:

$$MFX_{1-z}I_z \cdot uM^aX^a : yA : eJ : tD \quad \text{(formula I)}$$

The secondary portion is composed of a phosphor (also referred to herein as the "secondary phosphor") that includes a combination of species characterized by the relationship:

$$M'FX'_{1-z+q}I'_{z-q} \cdot u'M^{a'}X^{a'} : y'A' : e'J' : t'D' \quad \text{(formula II)}$$

M and M' are selected from the group consisting of Mg, Ca, Sr, and Ba. X and X' are selected from the group consisting of Cl and Br. $M^a$ and $M^{a'}$ are selected from the group consisting of Na, K, Rb, and Cs. For a storage phosphor, $M^a$ and $M^{a'}$ are preferably K. For a prompt emission phosphor, $M^a$ and $M^{a'}$ are preferably Na or Li. $X^a$ and $X^{a'}$ are selected from the group consisting of F, Cl, and Br. A and A' are selected from the group consisting of Eu, Ce, Sm, and Tb. J and J' are metal oxide and are preferably selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$. J and J' are more preferably selected from the group consisting of $Al_2O_3$ or $SiO_2$. D and D' are selected from the group consisting of V, Cr, Mn, Fe, Co, and Ni. u and u' are from 0 to 1. y and y' are from $1\times10^{-4}$ to 0.1. e and e' are from 0 to 1. t and t' are from 0 to $1\times10^{-2}$.

z is greater than $1\times10^{-2}$ and less than 1 and represents the same value in both relationships. q is from $1\times10^{-2}$ to 1 and is less than or equal to z. In particular embodiments of the invention, z is greater than 0.1 and less than 1 and q is from 0.1 to 1.

In some embodiments of the invention, M=M', X=X', $M^a=M^{a'}$, $X^a=X^{a'}$, A=A', J=J', D=D', u=u', y=y', e=e', and t=t'.

The same designations appearing elsewhere herein have the same meanings unless specifically stated to the contrary. Grouped species, for example the species defined by M, are to be understood as inclusive of combinations of species in that group. It should also be understood, that even when oxide is not specifically added, oxygen is a normal trace ingredient in phosphors described herein and phosphors known in the art generally, since it is not ordinary practice in the art to take the extraordinary measures necessary to exclude traces of oxygen from a phosphor preparation. The primary and secondary phosphors can be prepared in accordance with method disclosed in U.S. patent application Ser. No. 08/157,582, filed Nov. 24, 1993, now abandoned in favor of U.S. patent application Ser. No. 08/300,113, filed Sep. 2, 1994. In that method an oxosulfur reducing agent is added to the precursors for the phosphor and the resulting phosphor has an elemental composition that includes sulfur. The oxosulfur reducing agent includes a moiety or ion of the general formula $S_jO_k$, where j and k are positive integers such that $0.25 < j/k < 1.0$. The oxosulfur reducing agent is disclosed as being added to the precursor mixture, in a preferred concentration of a molar ratio of sulfur to alkaline earth metal of greater than $1\times10^{-4}$ and less than 0.020. Formulas I and II can thus be rewritten as:

$$MFX_{1-z}I_z \cdot uM^aX^a : yA : eJ : tD : dS \quad \text{(Formula Ia)}$$

and $$M'FX'_{1-z+q}I'_{z-q} \cdot u'M^{a'}X^{a'} : y'A' : e'J' : t'D' : d'S \quad \text{(formula IIa)}$$

where d and d' have values from 0 to 0.020.

Specific phosphors can be selected on the basis of suitability for a particular use. It is well-known to those skilled in the art that some alkaline earth metal fluorobromoiodide phosphors are more suitable for use as prompt emission phosphors and other alkaline earth metal fluorobromoiodide phosphors are more suitable for use as storage phosphors. For example, some storage phosphors suitable for use in the primary portion of the composite phosphor of the invention, include a combination of species characterized by the relationship:

$$-(Ba_{1-a-b-c}Mg_aCa_bSr_c)FX_{1-z}I_z \cdot uM^aX^a : yA:eJ:tD:dS$$

(formula III)

where X is selected from the group consisting of Cl and Br; $M^a$ is selected from the group consisting of Na, K, Rb and Cs; $X^a$ is selected from the group consisting of F, Cl, and Br; A is selected from the group consisting of Eu, Ce, Sm, and Tb; J is selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$; D is selected from the group consisting of V, Cr, Mn, Fe, Co, and Ni; a+b+c is from 0 to 0.4; z is from $1 \times 10^{-2}$ to 1; u is from 0 to 0.1; y is from $1 \times 10^{-4}$ to 0.1; e is from 0 to 0.1; t is from 0 to $1 \times 10^{-2}$; and d is from 0 to 0.020. A more specific example of such a phosphor includes a combination of species characterized by the relationship:

$$(Ba_{1-a-b-c}Mg_aCa_bSr_c)FBr_{1-z}I_z \cdot uKX^a : yA:eJ:tD$$

(formula IV)

where $X^a$, A, J, D, and z have the same meanings as presented above in relation to formula III; a+b+c is from 0 to 0.4; u is from $1 \times 10^{-6}$ to 0.1; y is from $1 \times 10^{-4}$ to 0.1; e is from $10^{-5}$ to 0.1; and t is from 0 to $1 \times 10^{-2}$.

The overall characteristics the composite phosphor mass are determined by a combination of factors, such as the molar concentrations of the primary and secondary phosphors and the topology and thickness of the secondary portion. The primary phosphor is selected on the basis of desired radiographic characteristics for the composite phosphor. The secondary phosphor, typically, has less preferred, but still acceptable and efficient, radiographic characteristics. The resulting composite phosphor has good radiographic characteristics. In particular embodiments of the invention, the composite phosphor provides a phosphor efficiency, i.e., speed, that is an overall improvement over the primary phosphor.

The composite phosphor has increased resistance to oxygen and moisture relative to the corresponding primary phosphor. That increased resistance can be described as a reduction in the rate of loss of speed with aging, relative to the primary phosphor. The term "aging" refers to a period of unprotected exposure to the ambient environment or exposure to a test environment mimicking conditions of phosphor use. The speed loss is expressed as the decrease in immediate luminescence for a prompt emission phosphor and as the decrease in photostimulated luminescence response (PSL) for a storage phosphor. Reference herein to speed or a related parameter, such as PSL, represent initial values, without substantial aging, unless specifically indicated to the contrary.

The resistance of the primary and secondary phosphors to ambient moisture and oxygen is inversely proportional to the concentration of iodide in the phosphor. The secondary phosphor is more resistant than the primary phosphor. This is conveniently expressed, relative to the above stoichiometric relationships, as the ratio q:z or the fraction q/z. The greater the value of q/z, the greater the moisture and oxygen resistance of the secondary phosphor relative to the primary phosphor. In particular embodiments of the composite phosphor, z is greater than 0.1 and q/z is from about 0.5 to 1, or preferably, q/z is about 1.0.

The size and shape of the composite phosphor mass are determined, in the same manner as other phosphors, by requirements of a particular use and factors such as manufacturing constraints. Convenient parameters for a phosphor particulate useful in radiographic panels are a median particle size of from 1 to 40 micrometers. Primary phosphor cores can be prepared so as to approximate the size of the composite phosphor. The secondary portion can represent only a small fraction of the surface of the composite phosphor; however, it is desirable that the secondary portion represents all or most of the surface of the phosphor mass. The thickness of the secondary portion can vary. There is theoretically no upper limit on the thickness or relative percentage of the secondary phosphor in the composite phosphor; however, deterioration of radiographic characteristics is expected at very high thicknesses or relative percentages, if, by no other means than displacement of the highly efficient primary phosphor with the good, but less efficient secondary phosphor. Examples of suitable thicknesses of the secondary portion range from about 10Å to 1 micrometer.

In currently preferred embodiments of the composite phosphor, the secondary portion represents substantially all of the surface of the composite phosphor mass and q/z is about 1. In some of those embodiments of the invention, between the primary and secondary portions is an intermediate portion having a composition intermediate between the primary and secondary portions. The intermediate portion can have a composition that represents a continuous gradient between the primary and secondary phosphors or can have a composition that varied as a step gradient or is otherwise discontinuous.

The composite phosphor of the invention is produced either by overcoating cores of primary phosphor or by forming the secondary portion in situ over the primary portion.

The overcoating can be performed in a variety of ways. In a non-preferred example, a particulate of primary phosphor cores can be prepared and then be mixed with precursor for the secondary phosphor. (The term "core" is used herein to refer to a body of primary phosphor that is a starting material for the modification method of the invention. In overcoating procedures, the primary phosphor cores remain substantially unchanged.) The mixture produced is then fired at a suitable temperature and pulverized in the same manner as a conventional phosphor. Suitable firing temperatures are those which do not cause a mass diffusion between the secondary and primary portions. The resulting product would be expected to have relatively thick areas of secondary phosphor overlying primary phosphor cores in a nonuniform, highly discontinuous manner. Overcoating could alternatively be performed by another technique such as vapor deposition of the secondary phosphor onto primary phosphor cores using, for example, a gas fluidized bed. The resulting secondary portions would then to be thin, since vapor deposition techniques do not readily produce thick layers. The secondary portions would be continuous or discontinuous over the primary portions, depending upon how the cores were positioned and repositioned during vapor deposition. Overcoating procedures can be repeated varying the phosphor compositions to readily produce a composite phosphor having an intermediate portion with a uniform composition intermediate between that of the primary and secondary portions or with a composition varying in a manner dictated by the overcoating steps performed. Overcoating procedures can also provide composite phosphors having very different phosphors in different portions.

The secondary portion can be formed in situ by "halo-treating" the primary phosphor cores, that is, placing the primary phosphor cores in contact with a reactive chloro or bromo species or both. This results in a relative depletion of iodide and a relative enrichment in chloride and/or bromide. The phosphor in the halo-treated portion does not exhibit any other substantial change in composition from that of the primary phosphor. The change in halide composition only occurs in exposed surfaces and results in the formation of the secondary portion in place on the remaining primary portion. The particles remain substantially unchanged in size, but the percentage of primary phosphor in each particle is necessarily reduced. The halo-treating procedure also causes the formation of an intermediate portion between the primary and secondary portions. The intermediate portion has a composition that represents a continuous gradient between the primary and secondary phosphors. The intermediate portion generally exceeds the thickness of the secondary portion. The value of q/z in the secondary portion, is high in these embodiments, from 0.5 to 1.0, and preferably is from 0.9 to 1.0.

The reactive bromo or chloro species can be diatomic chlorine or bromine or other chloro and bromo reagents such as N-bromosuccinimide. It is expected that any inorganic or organic species capable of providing free chlorine or bromine can be used. The phosphor cores are necessarily the size of the desired composite phosphor particles. The reactive chloro or bromo species can be supplied in a variety of ways. For example, the composite phosphor can be prepared by ion-exchange using for example common salts of chloride or bromide. In a specific example of such a procedure, the primary phosphor is dispersed in a suitable solvent and an excess of soluble chloride or bromide salt or both are added to the dispersion. The chloride or bromide ion exchanges with iodide in the outside surface of the primary phosphor to yield the composite phosphor of the invention.

In a currently preferred embodiment of the invention, the secondary phosphor is formed in situ by treating the polycrystalline cores of primary phosphor with diatomic bromine or chlorine or a mixture of both. Halo-treatment causes the conversion of exposed primary phosphor to secondary phosphor. For example, with the primary phosphor, $BaFBr_{1-z}I_z$:Eu, the reaction scheme can be explained as:

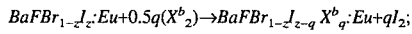
$$BaFBr_{1-z}I_z:Eu + 0.5q(X^b{}_2) \rightarrow BaFBr_{1-z}I_{z-q}X^b{}_q:Eu + qI_2;$$

where $X^b$ represents bromo or chloro. (This representation accurately represents reactants and phosphor product and provides stoichiometric agreement between reactants and products, but may not accurately represent the halogen product. Some XI might be formed. The claimed invention is not limited by any explanation or theory.)

A variety of procedures can be used in treating the polycrystalline primary phosphor cores with diatomic bromine or chlorine. The reaction can be performed in a suitable solvent or by treating the powdered phosphor with a gaseous stream of chlorine or bromine. The secondary portion can be readily provided as a substantially uniform layer by ensuring uniform mixing of diatomic bromine or chlorine and the primary phosphor cores. Conventional mixing techniques, like stirring primary phosphor cores dispersed in a liquid or mechanically agitating phosphor cores in a gas stream, can be used to provide substantially uniformly reacted composite phosphor.

In addition to producing the secondary portion, the halo-treatment results in a composite phosphor that has an initial (unaged) speed that is higher than the initial speed of the corresponding primary phosphor. A theoretical explanation can be provided for this effect, however the scope of the invention is not limited by any theory or explanation. It is believed that the treatment with diatomic chlorine and/or bromine removes crystalline defects and impurities such as $OH^-$ and $O^{2-}$ trapped at the surface of the phosphor. Surface defects and surface impurities are believed to diminish the efficiency and hence the light output of phosphors. It is believed that the phosphor of the present invention contains reduced concentrations of surface impurities and surface defects. This effect may be responsible for the higher speeds observed in the phosphors disclosed herein.

A correlation has been determined between increased initial speed and decreased loss of speed with aging (also referred to herein as "keep"). A secondary portion having a thickness sufficient to produce a relative increase in initial speed is also sufficient to cause an increase in keep (less loss of speed with aging).

The phosphor modification method of the invention is not limited to individual phosphors. For example, a particulate mixture of different primary phosphor cores could be used. The method of the invention can also be performed on mixtures that include phosphors lacking iodide. In that case, the benefit provided by the modification method would be expected to be reduced to reflect the percentage of the mixture that represented iodide containing phosphor.

The radiographic phosphor panel of the invention has a support and a luminescent layer overlaying the support. The luminescent layer includes the composite phosphor in the form of a particulate mass. The following description is primarily directed to radiographic image storage panels, however, the invention is not limited to storage panels; but is also applicable to prompt emission panels such as intensifying screens.

The luminescent layer of the phosphor panel of the invention contains a polymeric binder to give it structural coherence. In general the binders useful in the practice of the invention are those conventionally employed in the art. Binders are generally chosen from a wide variety of known organic polymers which are transparent to x-rays, stimulating, and emitted light. Binders commonly employed in the art include sodium o-sulfobenzaldehyde acetal of poly(vinyl alcohol); chlorosulfonated poly(ethylene); a mixture of macromolecular bisphenol poly(carbonates) and copolymers comprising bisphenol carbonates and poly(alkylene oxides); aqueous ethanol soluble nylons; poly(alkyl acrylates and methacrylates) and copolymers of poly(alkyl acrylates and methacrylates with acrylic and methacrylic acid); poly(vinyl butyral); and poly(urethane) elastomers. These and other useful binders are disclosed in U.S. Pat. Nos. 2,502,529; 2,887,379; 3,617,285; 3,300,310; 3,300,311; and 3,743,833; and in *Research Disclosure*, Vol. 154, February 1977, Item 15444, and Vol. 182, June 1979. *Research Disclosure* is published by Kenneth Mason Publications, Ltd., Emsworth, Hampshire PO10 7DD, England. Particularly preferred binders are poly(urethanes), such as those commercially available under the trademark Estane from Goodrich Chemical Co., the trademark Permuthane from the Permuthane Division of ICI, and the trademark Cargill from Cargill, Inc.

Any conventional ratio of phosphor to binder can be employed. Generally thinner phosphor layers and sharper images are realized when a high weight ratio of phosphor to binder is employed. Preferred phosphor to binder ratios are in the range of from about 7:1 to 25:1 for panel constructions intended to withstand commercial exposure repetitions without loss of structural integrity. For limited or single exposure applications it is, of course, appreciated that any minimal amount of binder consistent with structural integrity is satisfactory.

For the highest attainable speeds a white support, such as a titania or barium sulfate loaded or coated support is employed. Particular reflective supports which offer a balance of speed and sharpness are those containing reflective microlenslets, such as are disclosed in U.S. Pat. No. 4,912,333 to Roberts, et al. In those instances in which it is desired to reduce the effective thickness of a phosphor layer below its actual thickness the phosphor layer is modified to impart a small, but significant degree of light absorption. If the binder is chosen to exhibit the desired degree of light absorption, then no other ingredient of the phosphor layer is required to perform the light attenuation function. It is specifically noted that the less structurally complex chromophores for ultraviolet absorption particularly lend themselves to incorporation in polymers. A separate absorber can be incorporated in the phosphor layer to reduce its effective thickness. The absorber can be a dye or pigment capable of absorbing light within a desired spectrum. Black dyes and pigments such as carbon black are, of course, generally useful with phosphors, because of their broad absorption spectra. With storage panels, it is preferable to include a dye or pigment which absorbs some of the stimulating radiation, generally provided by a laser; but mostly reflects emitted light. U.S. Pat. No. 4,491,736, to Teraoka, teaches the use of such materials in storage panels.

Apart from the phosphor layers and the assembly features described above, the panel can be of any conventional construction. Panels typically have one or more flexible or rigid support layers. Flexible layers are most commonly polymeric. The most common polymeric supports are films of high dimensional integrity, such as poly(ethylene terephthalate) film supports. In a preferred embodiment of the invention, support is provided by one or more polymeric layers and by a rigid plate of aluminum or the like.

Metal layers, such as aluminum, enhance reflection. Paper supports, though less common than film supports, are known and can be used for specific applications. Dyes and pigments are commonly loaded into supports to enhance absorption or reflection of light. Air can be trapped in supports to reflect ultraviolet and visible light. Supports and the subbing layers used to improve coating adhesion can be chosen from among those employed for silver halide photographic and radiographic elements, as illustrated by *Research Disclosure*, Vol. 176, December 1978, Item 17643, Section XVII, and *Research Disclosure*, Vol. 184, August 1979, Item 18431, Section I.

An overcoat layer, although not required, is commonly located over the luminescent layer for humidity and wear protection. If the panel includes an overcoat layer, the oxosulfur reducing agent can be located in the overcoat layer or the luminescent layer or both. The overcoat layer comprises a binder chosen using the criteria described above for the binder in the luminescent layer. It is understood that the binder used in the overcoat layer, and the binder forming the matrix in which the phosphor particles are held, are preferably formed of transparent resins that do not interfere with the passage of x-rays or stimulating radiation or the emitted light from the phosphors. The overcoat binder can be the same binder as in the luminescent layer or different and can also be chosen from polymers useful for supports. Since it is generally required that the overcoat layer exhibit toughness and scratch resistance, polymers conventionally employed for film supports are favored. For example, cellulose acetate is an overcoat commonly used with the poly(urethane) binders. Overcoat polymers are often used also to seal the edges of the phosphor layer. A suitable overcoat is disclosed in U.S. Pat. No. 5,401,971.

While anticurl layers are not required for the panels, they are generally preferred for inclusion. The function of the anticurl layer is to balance the forces exerted by the layers coated on the opposite major surface of a support which, if left unchecked, cause the support to assume a non-planar configuration, that is, to curl or roll up on itself. Materials forming the anticurl layers can be chosen from among those identified above for use as binders and overcoats. Generally an anticurl layer is formed of the same polymer as the overcoat on the opposite side of the support. For example, cellulose acetate is preferred for both overcoat and anticurl layers.

Any one or combination of conventional panel features compatible with the features described herein can, of course, be employed. Conventional storage panel constructions are disclosed in U.S. Pat. No. 4,380,702 to Takahashi et al, the disclosure of which is hereby incorporated by reference. Conventional intensifying panel constructions are disclosed in *Research Disclosure*, Vol. 184, August 1979, Item 18431, hereby incorporated herein by reference.

The radiographic panels of the invention are formed by conventional coating techniques. Phosphor powder, oxosulfur reducing agent and other addenda are mixed with a solution of a resin binder material and coated by means such as blade coating onto a substrate. U.S. Pat. No. 4,505,989, to Umemoto et al, the disclosure of which is hereby incorporated herein by reference, describes suitable techniques known in the art for preparing an X-ray image storage panel.

The following Examples and Comparative Examples are presented to further illustrate and elucidate some preferred modes of practice of the invention. Unless otherwise indicated, all starting materials were commercially obtained.

Preparation of $BaFBr_{0.85}I_{0.15}:0.001Eu^{2+}$ phosphor cores:

The indicated primary phosphor cores were prepared as follows. Into a 2000 ml beaker containing a fluorocarbon coated magnetic stir bar, 269.54 grams of $BaBr_2 \cdot 2H_2O$ and 62.22 grams of $BaI_2 \cdot 2H_2O$ were dissolved in a 2- to 3-fold excess of distilled water. The solution was filtered. To the filtered solution was then added 2.88 grams of fumed silica and 0.500 grams of $BaS_2O_3 \cdot H_2O$ followed by 0.088 g KBr. 175.33 g of $BaF_2$ containing 0.002 moles of $EuF_2$ and 0.01 mol $CaF_2$ were then added to the solution slowly with vigorous stirring. Stirring was maintained for about 1 hour and the resulting slurry was then spray-dried through an air driven rotary atomizer at an inlet temperature of 350° C. and an outlet temperature of 110° C. The resulting white powder was then placed into alumina crucibles and fired at a temperature of 840–860° C. for 3.5 hours under flowing nitrogen. The resulting sintered agglomeration, after being allowed to cool under nitrogen, was then ground and sieved through a 38 micrometer mesh. The phosphor particulate was then dry ball-milled using alumina beads to obtain a phosphor particle size suitable for radiography. The final particle size distribution of the phosphor was from about 1 to 25 micrometers with a median at about 8 micrometers.

Preparation of $BaFBr_{0.75}I_{0.25}:0.001Eu^{2+}$ phosphor cores:

Phosphor cores was prepared in the same manner as previously described, except precursor amounts were varied to provide the indicated composition.

Preparation of Radiographic Image Storage Panels:

Image storage panels were prepared by the following general procedure. Primary phosphor core or composite phosphor was dispersed in a 13% (weight/weight) solution of PERMUTHANE™ U-6366 polyurethane marketed by ICI Polyurethanes Group of West Deptford, N.J. in 93:7 (weight/weight) dichloromethane/methanol solvent. The dispersions were milled 30 minutes with zirconium oxide beads on a paint shaker. The phosphor to binder ratio was about 15:1. Knife-coatings were prepared on a polyethylene terephthalate support. The knife-coatings were allowed to air-dry to produce luminescent layers. After drying, except where noted, the completed storage panels were overcoated with a polymer solution of cellulose acetate in acetone or with a fluorinated polymer, Kynar 7201 marketed by ELF Atochem North America, Inc., of Bloomington, Minn., or equivalent in acetone. For each set of experiments, the Example used a composite phosphor and the Comparative Example used the unmodified primary phosphor core equivalent to the primary portion of the composite phosphor. Each Example and Comparative Example was otherwise prepared in an identical manner.

Measurement of relative photostimulated luminescence (PSL) intensities:

The relative photostimulated luminescence (PSL) intensities of the phosphor powders and image storage panels were measured by packing the powders in aluminum planchets (2 mm high by 24 mm diameter), or by cutting 2.6 centimeter diameter disks from the panels, respectively, and simultaneously exposing each Example and its corresponding Comparative Example to filtered X-radiation. The X-ray source was a tungsten target tube operating at 70 kVp and 3.0 mA. The filtration consisted of a 3.5 centimeter thickness of aluminum. After exposure to X-rays, the samples and standard were stimulated with a 4-millisecond pulse at 633 nanometers from a 12 mW helium-neon laser. The stimulated emission was detected using a photomultiplier tube after passing through a Schott BG-25 filter. The responses were corrected for X-ray exposure variations by normalizing the measured response in each case to an internal standard. The PSL responses for particular composite phosphor Examples are reported relative to a corresponding primary phosphor core Comparative Example handled in an identical manner. The response of the Comparative Example in each case was arbitrarily set equal to 100. The measured PSL responses were corrected for variations in phosphor coverage by dividing by the coverage value determined for that particular disk.

COMPARATIVE EXAMPLES 1–5

Primary phosphor cores having the compositions indicated in Table 1 were prepared and evaluated as above-described.

EXAMPLES 1–4

Primary phosphor cores having the compositions indicated in Table 1 were prepared as above-described. Composite phosphors were then prepared as follows. All material amounts, concentrations, times and other experimental details are specified in Table 1. Into a round-bottomed flask containing a magnetic stir bar was placed the indicated primary phosphor cores. To the flask was then added the $Br_2$/methanol solution and, as indicated, an additional amount of methanol and the contents stirred magnetically. The treated phosphor was then collected by vacuum filtration on a glass frit, washed with a small amount of methanol and dried in an atmosphere of dry nitrogen. The PSL responses of the materials were then measured as previously described. PSL responses were measured simultaneously for each Example and its respective Comparative Example.

EXAMPLE 5

The phosphor of Example 5 was prepared by the following procedure: $BaFBr_{0.85}I_{0.15}$:Eu (10.00 grams) was placed in a round-bottomed flask along with 100.00 ml of dry carbon tetrachloride and a magnetic stir bar. The suspension was stirred and degassed with dry argon. $Cl_2$ gas was then bubbled through the reaction mixture at a rate of about 10 $cm^3$/min. for 1 hour. Argon was then bubbled through the suspension to remove the remaining chlorine gas and the phosphor was collected, dried and measurements were performed in the same manner as for Examples 1–5.

COMPARATIVE EXAMPLE 6

A radiation image storage panel was prepared and evaluated as above-described using, as phosphor, the primary phosphor cores of Comparative Example 4. Results are presented in Table 2.

EXAMPLE 6

A radiation image storage panel was prepared and evaluated as above-described using, as phosphor, the composite phosphor of Example 4. Results are presented in Table 2.

COMPARATIVE EXAMPLES 7–8

Phosphor was modified by the following procedure. For Comparative Example 7, a particulate of $BaFBr_{0.85}I_{0.15}$:Eu (25.00 grams) was placed in a round-bottomed flask along with 50.0 ml of dry methanol. $NH_4F$ (2.00 grams) in 100.0 ml of methanol was then added to the suspension and the contents stirred magnetically for about 30 minutes. The treated phosphor cores were then collected by vacuum filtration on a glass frit, washed with a small amount of methanol and dried in an atmosphere of dry nitrogen. The PSL response was measured as above-described. Photostimulated luminescence response was measured simultaneously for the untreated phosphor core material (Comparative Example 8). Results are reported in Table 3.

As is apparent from the tables, preparation of image storage panels utilizing phosphors treated as described herein, results in image storage panels which are significantly improved in PSL response and long term stability.

TABLE 1

| Example or Comp. Example | Phosphor | Treatment | PSL Response |
|---|---|---|---|
| Comp. Example 1 | $BaFBr_{0.75}I_{0.25}$:Eu 10.00 grams | none | 100 |
| Example 1 | $BaFBr_{0.75}I_{0.25}$:Eu 10.00 grams | 50 mL $CH_3OH$ + 10.00 mL 0.03 M $Br_2$/$CH_3OH$; stirred 1 hr | 140 |
| Comp. Example 2 | $BaFBr_{0.75}I_{0.25}$:Eu 5.00 grams | none | 100 |
| Example 2 | $BaFBr_{0.75}I_{0.25}$:Eu 5.00 grams | 50 mL $CH_3OH$ + 5.00 mL 0.2 M $Br_2$/$CH_3OH$; stirred 1 hr | 127 |
| Comp. Example 3 | $BaFBr_{0.85}I_{0.15}$:Eu 110.00 grams | none | 100 |
| Example 3 | $BaFBr_{0.85}I_{0.15}$:Eu 110.00 grams | 100 mL $CH_3OH$ + 86.00 mL 0.303 | 120 |

TABLE 1-continued

| Comp. Example 4 | BaFBr$_{0.85}$I$_{0.15}$:Eu 110.00 grams | M Br$_2$/CH$_3$OH; stirred 3 hr none | 100 |
|---|---|---|---|
| Example 4 | BaFBr$_{0.85}$I$_{0.15}$:Eu 110.00 grams | 200 mL CH$_3$OH + 2 mL Br$_2$; stirred 2.5 hr | 117 |
| Comp. Example 5 | BaFBr$_{0.85}$I$_{0.15}$:Eu 10.00 grams | none | 100 |
| Example 5 | BaFBr$_{0.85}$I$_{0.15}$:Eu 10.00 grams | 100 mL CCl$_4$ + Cl$_2$ gas at 10 cc/min; stirred 1 hr | 121 |

TABLE 2

| Example or Comp. Example | Initial PSL Response(t = 0) | Final PSL Response (t = 60 days) |
|---|---|---|
| Example 6 | 176 | 92 |
| Comp. Example 6 | 100 | 25 |

TABLE 3

| Example or Comparative Example | Photostimulated Luminescence Response |
|---|---|
| Comparative Example 7 | 100 |
| Example 7 | 97 |

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto:

What is claimed is:

1. A radiographic phosphor panel comprising a luminescent layer including a mass of phosphor particles, said phosphor particles each having a primary portion and a secondary portion, said secondary portion being exterior to and continuous with said primary portion, said primary portion comprising a primary phosphor including a combination of species characterized by the relationship:

$$MFX_{1-z}I_z \cdot uM^aX^a{:}yA{:}eJ{:}tD{:}dS$$

said secondary portion comprising a secondary phosphor including a combination of species characterized by the relationship:

$$M'FX'_{1-z+q}I_{z-q} \cdot u'M^{a'}X^{a'}{:}y'A'{:}e'J'{:}t'D'{:}d'S$$

wherein for said relationships

M and M' are the same or different and are each selected from the group consisting of Mg, Ca, Sr, and Ba and combinations thereof;

X and X' are the same or different and are each selected from the group consisting of Cl and Br and combinations thereof;

$M^a$ and $M^{a'}$ are the same or different and are each selected from the group consisting of Na, K, Rb, and Cs and combinations thereof;

$X^a$ and $X^{a'}$ are the same or different and are each selected from the group consisting of F, Cl, and Br and combinations thereof;

A and A' are the same or different and are each selected from the group consisting of Eu, Ce, Sm, and Tb and combinations thereof;

J and J' are the same or different and are each selected from the group consisting of BeO, MgO, CaO, SrO, BaO, ZnO, Al$_2$O$_3$, La$_2$O$_3$, In$_2$O$_3$, SiO$_2$, TiO$_2$, ZrO$_2$, GeO$_2$, SnO$_2$, Nb$_2$O$_5$, Ta$_2$O$_5$, and ThO$_2$, and combinations thereof;

D and D' are the same or different and are each selected from the group consisting of V, Cr, Mn, Fe, Co, and Ni and combinations thereof;

z is greater than $1 \times 10^{-2}$ and less than 1;

q is from $1 \times 10^{-2}$ to 1 and less than or equal to z;

u and u' are the same or different and are from 0 to 1;

y and y' are the same or different and are from $1 \times 10^{-4}$ to 0.1;

e and e' are the same or different and are from 0 to 1;

t and t' are the same or different and are from 0 to $1 \times 10^{-2}$; and d and d' are the same or different and are from 0 to 0.020.

2. The radiographic phosphor panel of claim 1 wherein said composite phosphor exhibits a greater photostimulated luminescence response than an equal amount of said primary phosphor or said secondary phosphor.

3. The radiographic phosphor panel of claim 1 wherein said secondary portion substantially encapsulates said primary portion.

4. The radiographic phosphor panel of claim 1 wherein said phosphor particles each have an intermediate portion disposed between said primary portion and said secondary portion, said intermediate portion having a combination of species characterized by a continuous gradient in composition between said primary and secondary portions, wherein said intermediate portion adjoining said primary portion has about the same composition as said primary phosphor and said intermediate portion adjoining said secondary portion has about the same composition as said secondary portion.

5. The radiographic phosphor panel of claim 4 wherein M=M', X=X', $M^a$=$M^{a'}$, $X^a$=$X^{a'}$, A=A', J=J', D=D', u=u', y=y', e=e', and t=t'.

6. The radiographic phosphor panel of claim 1 wherein M=M', X=X', $M^a$=$M^{a'}$, $X^a$=$X^{a'}$, A=A', J=J', D=D', u=u', y=y', e=e', and t=t'.

7. The radiographic phosphor panel of claim 1 wherein z is greater than 0.1 and q/z is from about 0.5 to 1.

8. The radiographic phosphor panel of claim 1 wherein z is greater than 0.1 and q/z is about 1.0.

9. The radiographic phosphor panel of claim 1 wherein $M^a$ and Ma' are K and J and J' are selected from the group consisting of Al$_2$O$_3$ or SiO$_2$.

10. The radiographic phosphor panel of claim 1 wherein said primary phosphor is further characterized by the relationship:

$$(Ba_{1-a-b-c}Mg_aCa_bSr_c)FX_{1-z}I_z \cdot uM^aX^a{:}yA{:}eJ{:}tD{:}dS$$

wherein

X is selected from the group consisting of Cl and Br and combinations thereof;

$M^a$ is selected from the group consisting of Na, K, Rb and Cs and combinations thereof;

$X^a$ is selected from the group consisting of F, Cl, and Br and combinations thereof;

A is selected from the group consisting of Eu, Ce, Sm, and Tb and combinations thereof;

J is selected from the group consisting of BeO, MgO, CaO, SrO, BaO, ZnO, $Al_2O_3$, $La_2O_3$, $In_2O_3$, $SIO_2$, $TiO_2$, $ZrO_2$, $GeO_2$, $SnO_2$, $Nb_2O_5$, $Ta_2O_5$, and $ThO_2$ and combinations thereof;

D is selected from the group consisting of V, Cr, Mn, Fe, Co, and Ni and combinations thereof;

a+b+c is from 0 to 0.4;

z is from $1\times10^{-2}$ to 1;

u is from 0 to 0.1;

y is from $1\times10^{-4}$ to 0.1;

e is from 0 to 0.1;

t is from 0 to $1\times10^{-2}$; and d is from 0 to 0.020.

11. The radiographic phosphor panel of claim 1 wherein said primary phosphor is further characterized by the relationship:

$$(Ba_{1-a-b-c}Mg_aCa_bSr_c)FBr_{1-z}J_z \cdot u\, KX^a{:}yA{:}eJ{:}tD{;}dS$$

wherein $X^a$ is selected from the group consisting of F, Cl, and Br and combinations thereof;

A is selected from the group consisting of Eu, Ce, Sm, and Tb and combinations thereof;

J is selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$ and combinations thereof;

D is selected from the group consisting of V, Cr, Mn, Fe, Co, and Ni and combinations thereof;

a+b+c is from 0 to 0.4;

z is from $1\times10^{-2}$ to 1;

u is from $1\times10^{-6}$ to 0.1;

y is from $1\times10^{-4}$ to 0.1;

e is from $1\times10^{-5}$ to 0.1;

t is from 0 to 1×10−2; and d is from 0 to 0.020.

12. A composition of matter comprising a mass of composite phosphor, said mass having a primary portion and a secondary portion, said secondary portion being exterior to and continuous with said primary portion, said primary portion comprising a primary phosphor including a combination of species characterized by the relationship:

$$MFX_{1-z}J_z \cdot uM^aX^a{:}yA{:}eJ{:}tD{:}ds$$

said secondary portion comprising a secondary phosphor including a combination of species characterized by the relationship:

$$M'FX'_{1-z+q}J_{z-q} \cdot u'M^{a'}X^{a'}{:}y'A'{:}e'J'{:}t'D'{:}d'S$$

wherein for said relationships

M and M' are the same or different and are each selected from the group consisting of Mg, Ca, Sr, and Ba and combinations thereof;

X and X' are the same or different and are each selected from the group consisting of Cl and Br and combinations thereof;

$M^a$ and $M^{a'}$ are the same or different and are each selected from the group consisting of Na, K, Rb, and Cs and combinations thereof;

$X^a$ and $X^{a'}$ are the same or different and are each selected from the group consisting of F, Cl, and Br and combinations thereof;

A and A' are the same or different and are each selected from the group consisting of Eu, Ce, Sm, and Tb and combinations thereof;

J and J' are the same or different and are each selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$, and combinations thereof;

D and D' are the same or different and are each selected from the group consisting of V, Cr, Mn, Fe, Co, and Ni and combinations thereof;

z is greater than $1\times10^{-2}$ and less than 1;

q is from $1\times10^{-2}$ to 1 and less than or equal to z;

u and u' are the same or different and are from 0 to 1;

y and y' are the same or different and are from $1\times10^{-4}$ to 0.1;

e and e' are the same or different and are from 0 to 1;

t and t' are the same or different and are from 0 to 1×10−2; and d and d' are the same or different and are from 0 to 0.020.

13. The composition of matter of claim 12 wherein said primary phosphor is further characterized by the relationship:

$$(Ba_{1-a-b-c}Mg_aCa_bSr_c)FX_{1-z}J_z \cdot uM^aX^a{:}yA{:}eJ{:}tD{;}dS$$

wherein

X is selected from the group consisting of Cl and Br and combinations thereof;

$M^a$ is selected from the group consisting of Na, K, Rb and Cs and combinations thereof;

$X^a$ is selected from the group consisting of F, Cl, and Br and combinations thereof;

A is selected from the group consisting of Eu, Ce, Sm, and Tb and combination thereof;

J is selected upon the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$ and combinations thereof;

D is selected from the group consisting of V, Cr, Mn, Fe, Co, and Ni and combinations thereof;

a+b+c is from 0 to 0.4;

z is from $1\times10^{-2}$ to 1;

u is from 0 to 0.1;

y is from $1\times10^{-4}$ to 0.1;

e is from 0 to 0.1;

t is from 0 to $1\times10^{-2}$; and d is from 0 to 0.020.

14. The composition of matter of claim 12 wherein said secondary portion substantially encapsulates said primary portion.

15. The composition of matter of claim 12 wherein said phosphor particles each have an intermediate portion disposed between said primary portion and said secondary portion, said intermediate portion having a combination of species characterized by a continuous gradient in composition between said primary and secondary portions, wherein said intermediate portion adjoining said primary portion has about the same composition as said primary phosphor and said intermediate portion adjoining said secondary portion has about the same composition as said secondary portion.

16. The composition of matter of claim 12 wherein M=M', X=X', $M^a=M^{a'}$, $X^a=X^{a'}$, A=A', J=J', D=D', u=u', y=y', e=e', and t=t'.

17. The composition of matter of claim 12 wherein z is greater than 0.1 and q/z is about 1.0.

18. The composition of matter of claim 12 wherein said primary phosphor is further characterized by the relationship:

$$(Ba_{1-a-b-c}Mg_aCa_bSr_c)FBr_{1-z}I_z \cdot uKX^a : yA : eJ : tD : dS$$

wherein $X^a$ is selected from the group consisting of F, Cl, and Br and combinations thereof;

A is selected from the group consisting of Eu, Ce, Sm, and Tb and combinations thereof;

J is selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$ and combinations thereof;

D is selected from the group consisting of V, Cr, Mn, Fe, Co, and Ni and combinations thereof;

a+b+c is from 0 to 0.4;

z is from $1\times10^{-2}$ to 1;

u is from $1\times10^{-6}$ to 0.1;

y is from $1\times10^{-4}$ to 0.1;

e is from $1\times10^{-5}$ to 0.1;

t is from 0 to $1\times10^{-2}$; and d is from 0 to 0.020.

19. A phosphor modification method comprising providing a primary phosphor mass including a combination of species characterized by the relationship:

$$MFX_{1-z}I_z \cdot uM^aX^a : yA : eJ : tD : dS$$

and converting said primary phosphor mass into a composite phosphor mass having a primary portion and a secondary portion, said secondary portion being exterior to and continuous with said primary portion, said primary portion including a combination of species characterized by the relationship:

$$MFX_{1-z}I_z \cdot uM^aX^a : yA : eJ : tD : dS$$

said secondary portion including a combination of species characterized by the relationship:

$$M'F'X'_{1-z+q}I'_{z-q} \cdot u'M^{a'}X^{a'} : y'A' : e'J' : t'D' : d'S$$

wherein for said relationships

M and M' are the same or different and are each selected from the group consisting of Mg, Ca, Sr, and Ba and combinations thereof;

X and X' are the same or different and are each selected from the group consisting of Cl and Br and combinations thereof;

$M^a$ and $M^{a'}$ are the same or different and are each selected from the group consisting of Na, K, Rb, and Cs and combinations thereof;

$X^a$ and $X^{a'}$ are the same or different and are each selected from the group consisting of F, Cl, and Br and combinations thereof;

A and A' are the same or different and are each selected from the group consisting of Eu, Ce, Sm, and Tb and combinations thereof;

J and J' are the same or different and are each selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$, and combinations thereof;

D and D' are the same or different and are each selected from the group consisting of V, Cr, Mn, Fe, Co, and Ni and combinations thereof;

z is greater than $1\times10^{-2}$ and less than 1;

q is from $1\times10^{-2}$ to 1 and less than or equal to z;

u and u' are the same or different and are from 0 to 1;

y and y' are the same or different and are from $1\times10^{-4}$ to 0.1;

e and e' are the same or different and are from 0 to 1;

t and t' are the same or different and are from 0 to $1\times10^{-2}$; and d and d' are the same or different and are from 0 to 0.020.

20. The method of claim 19 wherein said composite phosphor exhibits a greater initial photostimulated luminescence response than an equal amount of said primary phosphor or said secondary phosphor.

21. The method of claim 18 wherein said converting is further characterized as exchanging halide ions of a reactant and iodides of said phosphor mass.

22. The method of claim 19 wherein said converting further comprises overcoating said primary phosphor mass with a combination of species characterized by the relationship defining said secondary portion.

23. The method of claim 19 wherein said converting further comprises overcoating said primary phosphor mass with a physical mixture of species characterized by the relationship defining said secondary portion and sintering said mixture.

24. The method of claim 17 wherein said converting further replacing a portion of the iodide in said primary phosphor mass with a halogen selected from the group consisting of chloride and bromide.

25. The method of claim 19 further comprises exposing said primary phosphor mass to reactive species selected from the group consisting of reactive chloro species and reactive bromo species.

26. The method of claim 25 wherein said reactive species are selected from the group consisting of diatomic chlorine and diatomic bromine.

27. The method of claim 25 wherein said converting further comprises forming an intermediate portion between said primary portion and said secondary portion, said intermediate portion having a combination of species characterized by a continuous gradient in composition between said primary and secondary portions, wherein said intermediate portion adjoining said primary portion has about the same composition as said primary phosphor and said intermediate portion adjoining said secondary portion has about the same composition as said secondary portion.

28. The method of claim 27 wherein q/z is about 1.

* * * * *